(12) United States Patent
Al-Mulhem

(10) Patent No.: US 10,087,736 B1
(45) Date of Patent: Oct. 2, 2018

(54) MULTILATERAL WELL DRILLED WITH UNDERBALANCED COILED TUBING AND STIMULATED WITH EXOTHERMIC REACTANTS

(71) Applicant: Saudi Arabian Oil Company, Dhahran (SA)

(72) Inventor: Abdulrahman Abdulaziz Al-Mulhem, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/797,832

(22) Filed: Oct. 30, 2017

(51) Int. Cl.
| | |
|---|---|
| *E21B 43/267* | (2006.01) |
| *E21B 7/04* | (2006.01) |
| *C09K 8/80* | (2006.01) |
| *C09K 8/66* | (2006.01) |
| *E21B 41/00* | (2006.01) |

(52) U.S. Cl.
CPC ............ *E21B 43/267* (2013.01); *C09K 8/665* (2013.01); *C09K 8/80* (2013.01); *E21B 7/04* (2013.01); *E21B 41/0035* (2013.01)

(58) Field of Classification Search
CPC ......... C09K 8/665; C09K 8/80; E21B 43/267; E21B 7/04; E21B 41/0035
See application file for complete search history.

(56) References Cited

U.S. PATENT DOCUMENTS

| | | | |
|---|---|---|---|
| 5,663,121 A | 9/1997 | Moody | |
| 7,419,005 B2 | 9/2008 | Al-Muraikhi | |
| 8,962,536 B2 | 2/2015 | Winslow et al. | |
| 9,388,677 B2 | 7/2016 | Alexandrov et al. | |
| 9,488,042 B2 | 11/2016 | Al-Nakhli et al. | |
| 9,556,718 B2 | 1/2017 | Al-Dahlan et al. | |
| 9,664,018 B2 | 5/2017 | Vandeponseele et al. | |
| 9,738,824 B2 | 8/2017 | Al-Nakhli et al. | |
| 2004/0140129 A1* | 7/2004 | Gardes | E21B 7/04 175/57 |
| 2007/0256838 A1 | 11/2007 | Baxter et al. | |
| 2012/0012308 A1* | 1/2012 | Ziauddin | E21B 47/06 166/250.1 |
| 2013/0211807 A1 | 8/2013 | Templeton-Barrett et al. | |
| 2014/0090839 A1 | 4/2014 | Al-Nakhli et al. | |

(Continued)

FOREIGN PATENT DOCUMENTS

| | | |
|---|---|---|
| WO | WO2015036317 A1 | 3/2015 |
| WO | WO2016127108 A1 | 8/2016 |

OTHER PUBLICATIONS

J. Brand, "Coiled Tubing Underbalanced Drilling May Increase Production at Lisburne Field, Alaska," Drilling Contractor, pp. 72-74, Mar./Apr. 2007.

*Primary Examiner* — Silvana C Runyan
(74) *Attorney, Agent, or Firm* — Bracewell LLP; Constance G. Rhebergen; Kevin R. Tamm

(57) ABSTRACT

A method of increasing a stimulated reservoir volume in a hydrocarbon-bearing formation in fluid communication with a wellbore, the method including drilling a plurality of lateral extensions at varying depths in the formation extending from a vertical wellbore using underbalanced coiled tubing drilling; and injecting an exothermic reaction component into the plurality of lateral extensions to create a plurality of fractures extending outwardly from and between the plurality of lateral extensions to create a multilateral fracture network.

14 Claims, 2 Drawing Sheets

(56) References Cited

U.S. PATENT DOCUMENTS

| | | | |
|---|---|---|---|
| 2014/0262249 A1* | 9/2014 | Willberg | E21B 43/247 166/251.1 |
| 2015/0175879 A1* | 6/2015 | Al-Nakhli | E21B 43/26 166/300 |
| 2015/0300143 A1* | 10/2015 | Al-Nakhli | C09K 8/665 166/280.1 |
| 2015/0330198 A1 | 11/2015 | Al-Mulhem et al. | |
| 2016/0003015 A1 | 1/2016 | Chang | |
| 2016/0265326 A1 | 9/2016 | Nguyen et al. | |

* cited by examiner

MULTILATERAL WELL DRILLED WITH UNDERBALANCED COILED TUBING AND STIMULATED WITH EXOTHERMIC REACTANTS

BACKGROUND

Field

The present disclosure relates generally to the enhanced recovery of hydrocarbons in a hydrocarbon-bearing formation drilled with multiple lateral sections. Specifically, the disclosure relates to the use of underbalanced coiled tubing drilling with an exothermic reaction component.

Description of the Related Art

Oil and gas wells in tight reservoirs are stimulated by hydraulic fracturing, which is a field practice to enhance production from otherwise uneconomic wells. Hydraulic fracturing operations can be applied in open-hole or cased-hole recovery wells. In general, fracturing processes are carried out using completions that will isolate part of a horizontal well section, perforate casing if the well is cased, and then pump the fracturing fluid to initiate and propagate fractures in one or more lateral extensions. In some cases, tight formations have greater stress values, and rock with greater compressive strength values creates difficulty propagating fractures using hydraulic fracturing. As a result, drillers sometimes use multilateral wells to compensate and maximize the surface area that connects a recovery well to a hydrocarbon-bearing reservoir by drilling several laterals from the main vertical well using underbalanced coiled tubing drilling. This method can be used in unconventional gas reservoirs, which have low permeability, for example.

A conventionally practiced method of stimulating a horizontal lateral is by the multistage fracturing technique (MSF). However, this method is very expensive, logistically-challenging, and costly in drilling, completion, and stimulation, and oftentimes has a limited effect in making economic wells.

SUMMARY

The present disclosure shows multilateral well completion, drilled with underbalanced coiled tubing and treated with one or more exothermic reaction component, having surprising and unexpected advantages with respect to increasing hydrocarbon-recovery through multilateral fracture networks. One or more exothermic reaction component is pumped or injected into laterals extending from a vertical wellbore, for example before, during, or after hydraulic fracturing, or in the absence of hydraulic fracturing. An open-hole or cased-hole recovery well can be used to inject the exothermic reaction component to create mini-fractures between laterals at different vertical heights in a hydrocarbon-bearing formation, for example a tight formation or a carbonate or sandstone formation. Multilateral fracture networks help maximize reservoir contact with multilateral recovery laterals and enhance well productivity and economics.

Systems and methods of multilateral horizontal drilling, and optionally fracturing, with underbalanced coiled tubing drilling along with one or more exothermic reaction components, in some embodiments, reduces or eliminates damage caused by drilling fluids in certain overbalanced drilling operations. Also, one or more exothermic reaction components of the present disclosure create small fractures that maximize reservoir contact with recovery laterals, and therefore improve well productivity.

Therefore, disclosed here is a method of increasing a stimulated reservoir volume in a hydrocarbon-bearing formation in fluid communication with a wellbore, the method including the steps of drilling a plurality of lateral extensions at varying depths in the formation extending from a vertical wellbore using underbalanced coiled tubing drilling; and injecting an exothermic reaction component into the plurality of lateral extensions to create a plurality of fractures extending outwardly from and between the plurality of lateral extensions to create a multilateral fracture network. In some embodiments of the method, the steps of drilling and injecting are carried out simultaneously. In other embodiments, the step of injecting is carried out after the step of drilling. Still in yet other embodiments, the step of injecting includes positioning coiled tubing at a toe of a lateral extension to inject the exothermic reaction component, and withdrawing the coiled tubing from the toe of the lateral toward a heel of the lateral while injecting the exothermic reaction component.

In some embodiments, the method further includes the use of concentric coiled tubing operable to inject components of the exothermic reaction component separately such that the exothermic reaction component reacts to produce pressure and heat once disposed in a lateral extension of the plurality of lateral extensions. Still in yet some other embodiments, the method further includes the steps of mixing the exothermic reaction component in an aqueous solution to achieve a pre-selected solution pH, wherein the exothermic reaction component is operable to react at a pre-selected reservoir temperature to generate a pressure pulse; mixing the aqueous solution with a viscous fluid component to form a fracturing fluid, the viscous fluid component operable to fracture the hydrocarbon-bearing formation to create fractures, and the fracturing fluid further comprising a proppant component, the proppant component carried to the plurality of fractures by the viscous fluid component, the proppant component operable to hold open the fractures; injecting the fracturing fluid into the wellbore in the hydrocarbon-bearing formation; and generating a pressure pulse when the exothermic reaction component reaches the pre-selected reservoir temperature, such that the pressure pulse is operable to create at least a portion of the plurality of fractures.

In certain embodiments, the exothermic reaction component comprises an ammonium containing compound and a nitrite containing compound. Still in other embodiments, the ammonium containing compound comprises $NH_4Cl$ and the nitrite containing compound comprises $NaNO_2$. In some embodiments, the pre-selected solution pH is between 5.7 and 9. Still in other embodiments, the reservoir temperature is in a range between 48.8° C. (120° F.) and 121.1° C. (250° F.). In other embodiments, the pressure pulse is between 500 psi and 50,000 psi. Still in other embodiments, the pressure pulse creates fractures in less than 10 seconds. In certain embodiments, the pressure pulse creates fractures in less than 5 seconds.

Additionally disclosed is a system for increasing a stimulated reservoir volume in a hydrocarbon-bearing formation in fluid communication with a wellbore, the system including a vertical wellbore; a plurality of lateral extensions at varying depths in the formation extending from the vertical wellbore and drilled at least in part using underbalanced coiled tubing drilling; and a plurality of fractures extending outwardly from and between the plurality of lateral extensions to create a multilateral fracture network, where the plurality of fractures do not cause damage to the formation or reduce permeability, the plurality of fractures being created at least in part by injecting a non-combustive exothermic reaction component into the plurality of lateral extensions.

In certain embodiments, the system further includes a proppant to support the plurality of fractures. Still in other embodiments, at least two lateral extensions of the plurality of lateral extensions align generally along a vertical plane. And yet in other embodiments, the plurality of fractures includes a first plurality of fractures extending from a first lateral extension and the plurality of fractures includes a second plurality of fractures extending from a second lateral extension, and the first plurality of fractures and second plurality of fractures at least partially intersect and create a portion of the multilateral fracture network between the first lateral extension and the second lateral extension.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of systems of and methods of making multilateral fracture networks with underbalanced coiled tubing, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Figure 1:
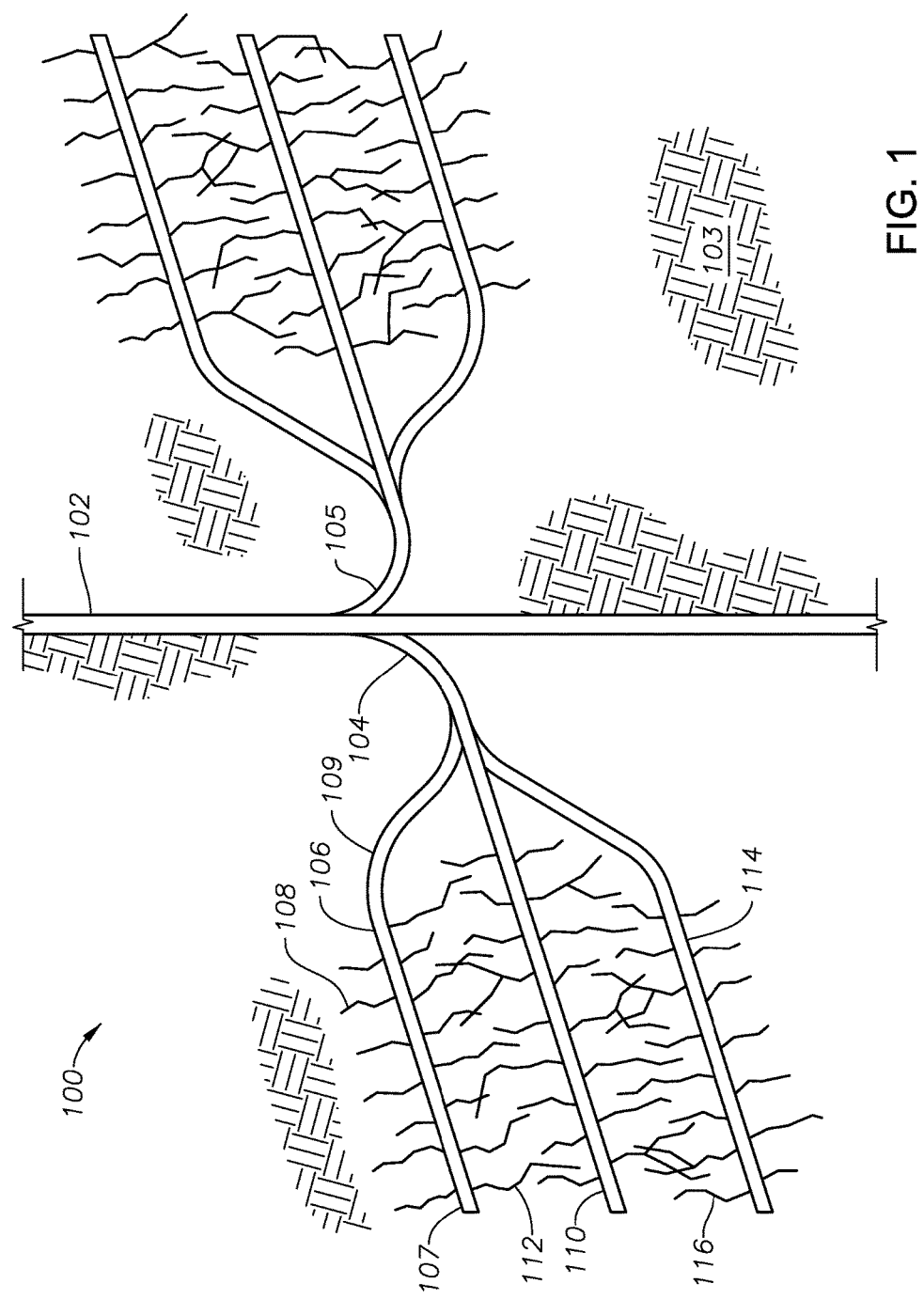
FIG. 1 is a diagram of one example of a multilateral hydrocarbon recovery network in a hydrocarbon-bearing formation with a multilateral fracture network, drilled with underbalanced coiled tubing and fractured, in part, using an exothermic reaction component.

Referring first to FIG. 1, a diagram is provided of one example of a multilateral hydrocarbon recovery network in a hydrocarbon-bearing formation with a multilateral fracture network, drilled with underbalanced coiled tubing and fractured, in part, using an exothermic reaction component. In multilateral fracture network recovery system 100 vertical well 102 is disposed in hydrocarbon-bearing formation 103, and can be an open-hole recovery well or a cased-hole recovery well, and vertical well 102 includes primary horizontal laterals 104, 105. If vertical well 102 is cased, perforations can be used to aid in the drilling of primary horizontal laterals 104, 105. From primary lateral 104 extends branched horizontal laterals 106, 110, and 114 at similar or variable vertical depths and horizontal lengths, depending on the target reservoir formation. From branched horizontal laterals 106, 110, 114 extend plurality of fractures 108, 112, 116, respectively, forming an overall fracture network which increases recovery of hydrocarbons from the formation to the branched horizontal laterals 106, 110, 114 and ultimately up through vertical well 102.

Horizontal laterals are generally about 100 feet (ft.) to about 300 ft., for example about 200 ft., vertically spaced apart and can be located at similar or variable vertical depths depending on the landing of the lateral in the target reservoir formation. Created fractures, such as for example plurality of fractures 108, 112, 116, may extend from about 10 ft. to about 100 ft., for example about 50 ft., outwardly from a lateral depending on the mechanical properties of the formation. Mini-fractures may extend only about a few feet to about 10 ft., but a plurality of mini-fractures can greatly increase lateral connection to producing zones.

Multilateral wells of the present disclosure, including multilateral fracture networks, cause, in some embodiments, extreme reservoir contact (ERC). In some embodiments, a multilateral fracture network recovery system, such as multilateral fracture network recovery system 100, can be drilled from a vertical well using a rotary drilling rig, and then several multilaterals can be drilled using underbalanced coiled tubing drilling, which is cost effective, efficient, and does not adversely affect a hydrocarbon-bearing formation by damaging rock permeability with drilling fluids, which can occur in conventional overbalanced drilling schemes and hydraulic fracturing.

During or after the drilling of multilaterals, such as for example branched horizontal laterals 106, 110, 114 in FIG. 1, one or more exothermic reaction component can be injected to further enhance the stimulated reservoir volume by creating mini-fractures, such as for example plurality of fractures 108, 112, 116, and thus maximize reservoir contact with a recovery well.

Fracturing systems and methods of the present disclosure can be applied in, for example, tight formations, sandstone formations, carbonate formations, and in gas wells, including those wells in unconventional reservoirs with low permeability rocks. Fracturing fluids used in overbalanced drilling can be damaging to a formation's permeability, and the disclosed systems and methods here result in enhanced productivity of gas wells, for example. An exothermic reaction component, for example optionally containing one or more exothermic reacting chemicals, for example a nitrite ion and an ammonium ion, applied either separately or together to branched horizontal laterals 106, 110, 114 in FIG. 1 can create outwardly extending fractures, including mini-fractures, when triggered, such as for example plurality of fractures 108, 112, 116. Exothermic reaction components containing an ammonium ion and nitrite ion for example have been shown to be suitable for creating fractures in tight formations.

Disclosed systems and methods enhance productivity of tight gas wells, for example, by increasing stimulated reservoir volume beyond currently existing fracturing and completion methods.

Figure 2:
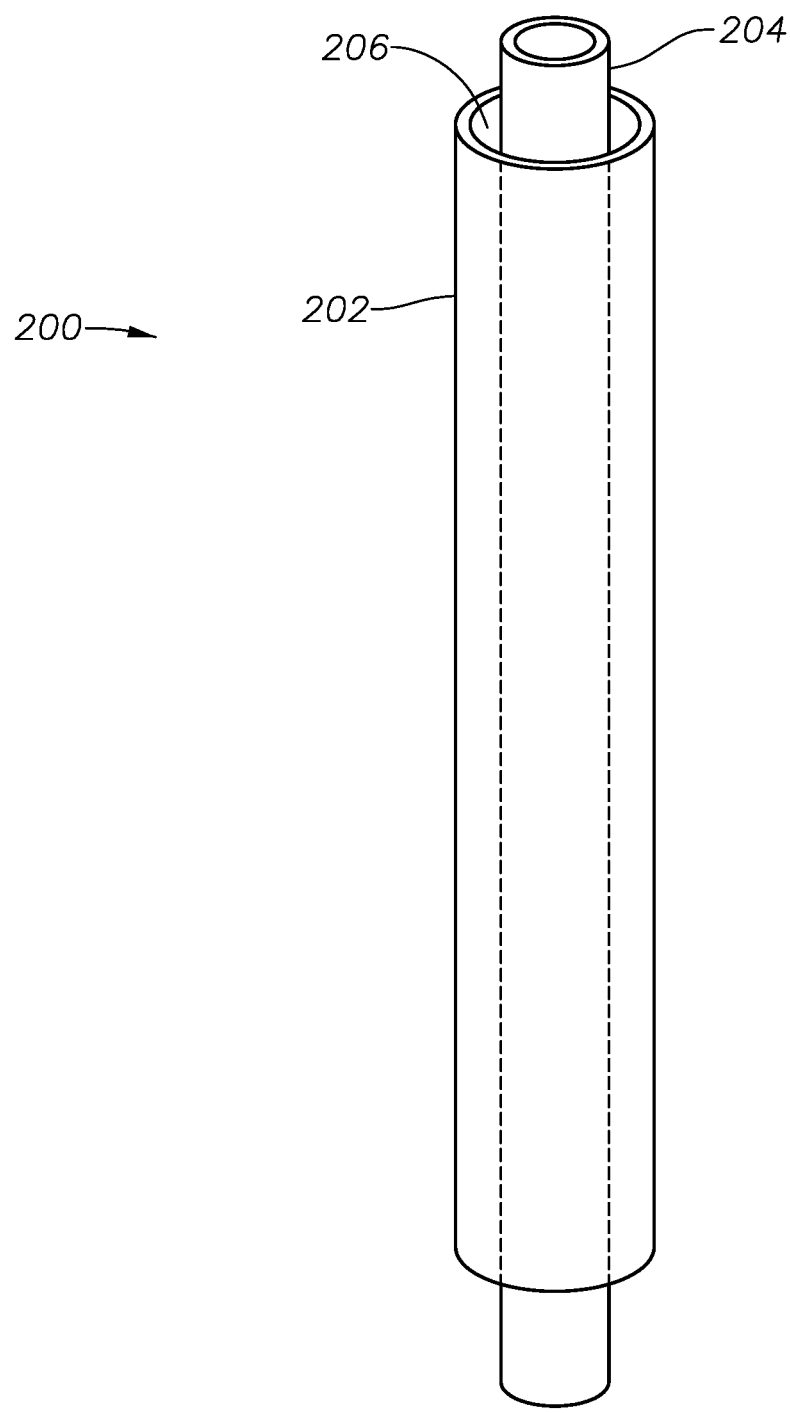
FIG. 2 is a diagram of a portion of concentric coiled tubing for use in injecting exothermic reactants to stimulate laterals completed using underbalanced coiled tubing drilling.

Referring now to FIG. 2, a diagram is provided of a portion of concentric coiled tubing for use in stimulating laterals using exothermic reactants completed using underbalanced coiled tubing drilling. Coiled tubing 200 includes outer coil 202, inner coil 204, and an annulus 206 disposed between outer coil 202 and inner coil 204. As shown, inner coil 204 is concentrically disposed within outer coil 202. With concentric coiled tubing, two fluids can be injected separately into a target lateral and then combined, for example an ammonium ion containing fluid and a nitrite ion containing fluid, to provide control over the placement of and reaction of exothermic chemicals in a particular lateral. In some embodiments, a single exothermic reaction component can be introduced with encapsulated chemicals, such that the chemicals do not react to produce heat and pressure until they are proximate the sand face in a given lateral.

Maximizing reservoir contact with multilaterals and stimulating them with at least one exothermic reaction component provides a greater stimulating effect over existing multistage fracturing methods performed in horizontal wells. Underbalanced coiled tubing drilling (UBCTD) in multilateral openhole completion wells aids in reducing and eliminating damage caused to formations by overbalanced drilling.

In some embodiments, exothermic chemicals are pumped downhole after all the multilaterals have been drilled and completed using UBCTD. In other embodiments, certain amounts of exothermic chemicals are pumped downhole during UBCTD of multilaterals. In some embodiments, exothermic chemicals are pumped into the toe of each drilled lateral using a concentric coiled tubing that will pump each of the chemicals alone or separately, such that they meet and react once they reach the formation. Concentric coiled tubing is a type of coiled tubing with a pipe inside the coil tubing pipe to enable the application of exothermic chemical injection into the zone of interest in a particular lateral drilled in a multilateral well drilled using UBCTD.

Injection of exothermic chemicals into the toe of a lateral and moving the concentric coil tubing out of the lateral towards the heel of the lateral while the exothermic chemicals are being pumped provides a unique method of stimulating a given lateral. For example, referring to FIG. 1, branched horizontal lateral 106 allows for concentric coiled tubing, such as for example coiled tubing 200 of FIG. 2, to place one or more exothermic chemicals of an exothermic reaction component into toe 107, and coiled tubing 200 can be withdrawn toward heel 109 as the exothermic reaction component is injected to create fractures, including mini-fractures, such as for example plurality of fractures 108. The process can be repeated into another lateral until all laterals in a multilateral well have been treated and a multilateral fracture network is created, with a certain of permeability and connectivity between different multilaterals.

If a multilateral well drilled using UBCTD is drilled in an ultra-tight formation, the drilled and completed laterals can be hydraulically fractured, and the exothermic chemical may be included in the fracturing fluids as described in U.S. Pat. No. 9,738,824 to further create more micro fractures that will enhance the stimulation treatment. However, the systems and methods described here can also be carried out in the absence of hydraulic fracturing.

Ultra-tight formations include those reservoir rocks where permeability can be as low as the nano-Darcy range making production of the hydrocarbons nearly impossible without a large stimulation treatment.

The exothermic reaction component can include one or more redox reactants that exothermically react to produce heat and increase pressure. Exothermic reaction components include urea, sodium hypochlorite, ammonium containing compounds, and nitrite containing compounds. In at least one embodiment, the exothermic reaction component includes ammonium containing compounds. Ammonium containing compounds include ammonium chloride, ammonium bromide, ammonium nitrate, ammonium sulfate, ammonium carbonate, and ammonium hydroxide. In at least one embodiment, the exothermic reaction component includes nitrite containing compounds. Nitrite containing compounds include sodium nitrite and potassium nitrite. In at least one embodiment, the exothermic reaction component includes both ammonium containing compounds and nitrite containing compounds. In at least one embodiment, the ammonium containing compound is ammonium chloride, $NH_4Cl$. In at least one embodiment, the nitrite containing compound is sodium nitrite, $NaNO_2$.

In at least one embodiment, the exothermic reaction component includes two redox reactants: $NH_4Cl$ and $NaNO_2$, which react according to Equation 1:

Equation 1:

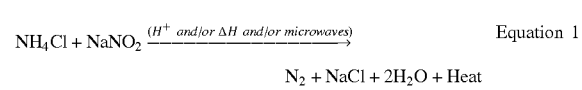

$$NH_4Cl + NaNO_2 \xrightarrow{(H^+ \ and/or \ \Delta H \ and/or \ microwaves)} N_2 + NaCl + 2H_2O + Heat$$

In a reaction of the exothermic reaction components according to the above equation, generated gas can contribute to a reduction of viscosity of residual viscous materials in the fractures of a formation possibly left behind from well fracturing operations (for example guar), and the heat and gas generated can also reduce the viscosity of viscous hydrocarbons, such as for example asphaltenes, further increasing hydrocarbon recovery.

The exothermic reaction component is triggered to react. In at least one embodiment, the exothermic reaction component is triggered within the laterals in addition to or alternative to triggered in pre-existing fractures. In at least one embodiment of the present disclosure, an acid precursor triggers the exothermic reaction component to react by releasing hydrogen ions, and in some embodiments the acid precursor is completely consumed by the exothermic reaction such that no residual acid remains to damage the formation or the well.

In at least one embodiment, the exothermic reaction component is triggered by heat. The wellbore temperature and temperature of laterals can be reduced during a pre-pad injection or a pre-flush with brine and reach a temperature below 120° F. (48.9° C.). A fracturing fluid of the present disclosure can then be injected into the well and the wellbore temperature increases from the heat of the formation. When the wellbore and lateral temperatures reach a temperature greater than or equal to about 120° F., for example, depending on the composition of the exothermic reaction component, the reaction of redox reactants is triggered. In at least one embodiment of the present disclosure, the reaction of the redox reactants is triggered by temperature in the absence of the acid precursor. In at least one embodiment of the present disclosure, the exothermic reaction component is triggered by heat when the exothermic reaction component is within multi-branched laterals, optionally proximate pre-existing fractures.

In at least one embodiment, the exothermic reaction component is triggered by pH. A base can be added to an exothermic reaction component of the present disclosure to adjust the pH to between about 9 to about 12. In at least one embodiment the base is potassium hydroxide. The exothermic reaction component, optionally along with other components such as fracturing fluid, with the base is injected into the formation. Following the injection of the fracturing fluid, an acid is injected to adjust the pH to below about 6. When the pH is below about 6, the reaction of the redox reactants is triggered. In at least one embodiment of the present disclosure, the exothermic reaction component is triggered by pH when the exothermic reaction component is within the fractures.

Dual-string coiled tubing can be used to introduce the exothermic reaction component and the acid precursor to the wellbore and the laterals. In at least one embodiment, the exothermic reaction component includes $NH_4Cl$ and $NaNO_2$. The acid precursor can include acetic acid. In some embodiments, the acetic acid is mixed with $NH_4Cl$ and is injected in parallel with the $NaNO_2$, using different sides of the dual-string coiled tubing. The exothermic reaction component and the acid precursor mix within the multilaterals.

In an alternate embodiment of the present disclosure, a method to increase a stimulated reservoir volume in a gas-containing formation is provided. The gas-containing formation can include a tight gas formation, an unconventional gas formation, and a shale gas formation. The stimulated reservoir volume is the volume surrounding a wellbore in a reservoir that has been fractured to increase well production. Stimulated reservoir volume is a concept useful to describe the volume of a fracture network. The method to increase a stimulated reservoir volume can be performed regardless of the reservoir pressure in the gas-containing formation. The method to increase a stimulated reservoir volume can be performed in a gas-containing formation having a reservoir pressure in a range of atmospheric pressure to 10,000 psig.

In methods of the present disclosure, the exothermic reaction component is mixed to achieve a pre-selected solution pH. The pre-selected solution pH is in a range of about 6 to about 9.5, alternately about 6.5 to about 9. In at least one embodiment, the pre-selected solution pH is 6.5. The exothermic reaction component can be mixed with a viscous fluid component and a proppant component to form a fracturing fluid. The fracturing fluid is injected into the wellbore in the gas-containing formation to create fractures and a proppant(s) holds open the fractures.

The exothermic reaction component reacts, and upon reaction generates an optional pressure pulse that creates auxiliary fractures. Fracturing fluid can be used in a primary operation to create fractures extending from multilaterals. Auxiliary fractures or mini-fractures can extend from larger fractures caused by the fracturing fluid, and all of these types of fractures extending from multilaterals at varying depths create a multilateral fracture network. The multilateral fracture network increases stimulated reservoir volume. In some embodiments, injection of a hydraulic fracturing fluid including a viscous fluid component in addition to or alternative to a proppant component in addition to or alternative to an overflush component in addition to or alternative to an exothermic reaction component does not generate foam or introduce foam into the hydraulic formation including the hydraulic fractures and multilaterals.

In at least one embodiment, the exothermic reaction component reacts when the exothermic reaction component reaches the wellbore temperature or the formation temperature. The wellbore temperature or formation temperature can be between about 100° F. and about 250° F., alternately between about 120° F. and about 250° F., alternately between about 120° F. and about 230° F., alternately between about 140° F. and about 210° F., alternately about 160° F. and about 190° F. In at least one embodiment, the wellbore temperature is about 200° F. In at least one embodiment, the wellbore temperature at which the exothermic reaction component reacts is affected by the pre-selected solution pH and an initial pressure. The initial pressure is the pressure of the exothermic reaction component just prior to the reaction of the exothermic reaction component. Increased initial pressure can increase the wellbore temperature that triggers the reaction of the exothermic reaction component. Increased pre-selected solution pH can also increase the wellbore temperature that triggers the reaction of the exothermic reaction component.

When the exothermic reaction component reacts, the reaction can generate a pressure pulse and heat, in a non-combustive reaction. The pressure pulse is generated within milliseconds from the start of the reaction. The pressure pulse is at a pressure between about 500 psi and about 50,000 psi, alternately between about 500 psi and about 20,000 psi, alternately between about 500 psi and about 15,000 psi, alternately between about 1,000 psi and about 10,000 psi, alternately between about 1,000 psi and about 5,000 psi, and alternately between about 5,000 psi and about 10,000 psi.

The pressure pulse creates fractures, including for example mini-fractures extending outwardly from and in between multilaterals. Fractures can extend from the point of reaction in all directions without causing damage to the wellbore or to multilaterals. The pressure pulse creates the auxiliary fractures regardless of the reservoir pressure. The pressure of the pressure pulse is affected by the initial reservoir pressure, the concentration of the exothermic reaction component, and the solution volume. In addition to the pressure pulse, the reaction of the exothermic reaction component releases heat. The heat released by the reaction causes a sharp increase in the temperature of the formation, which causes thermal fracturing. Thus, the heat released by the exothermic reaction component contributes to the creation of the auxiliary fractures. The exothermic reaction component allows for a high degree of customization to meet the demands of the formation and fracturing conditions.

In at least one embodiment, the acid precursor can be used to trigger the exothermic reaction component to react. In at least one embodiment, the exothermic reaction component is injected into the wellbore in the absence of the viscous fluid component and the proppant component and allowed to react to generate the pressure pulse.

In at least one embodiment, the method to increase a stimulated reservoir volume also performs the method to clean up a viscous material, for example asphaltenes, or a residual viscous material, for example guar. The method of the present disclosure can be adjusted to meet the needs of the fracturing operation. In one embodiment, a fracturing fluid includes an exothermic reaction component that reacts to both create auxiliary fractures and to cleanup residual viscous material from the fracturing fluid. In one embodiment of the present disclosure, a fracturing fluid includes an exothermic reaction component that reacts to only create auxiliary fractures. In one embodiment, a fracturing fluid includes an exothermic reaction component that reacts to only cleanup residual viscous material.

A method to increase the stimulated reservoir volume of a hydrocarbon-containing, for example gas-containing, formation is described herein. The method to increase a stimulated reservoir volume can be performed in oil-containing formations, water-containing formations, or any other formation. In at least one embodiment of the present disclosure, the method to increase a stimulated reservoir volume can be performed to create fractures and auxiliary fractures in cement. In some embodiments, microwaves can be applied in situ to aid in triggering an exothermic reaction component.

That claimed is:

1. A method of increasing a stimulated reservoir volume in a hydrocarbon-bearing formation in fluid communication with a wellbore, the method comprising the steps of:
drilling a plurality of lateral extensions at varying depths in the formation extending from a vertical wellbore using underbalanced coiled tubing drilling; and
positioning concentric coiled tubing at a toe of a lateral extension to inject an exothermic reaction component, and withdrawing the concentric coiled tubing from the toe of the lateral extension toward a heel of the lateral extension while pumping and injecting the exothermic reaction component to be disposed in the lateral extension to create fractures via a release of heat and pressure upon combination in the lateral extension of at least 2 components of the exothermic reaction component initially separated by the coiled tubing.

2. The method of claim 1, where the step of drilling includes simultaneously injecting an exothermic reaction component into the plurality of lateral extensions to create a plurality of fractures extending outwardly from and between the plurality of lateral extensions to create a multilateral fracture network.

3. The method of claim 1, further comprising the steps of:
mixing the exothermic reaction component in an aqueous solution to achieve a pre-selected solution pH, wherein the exothermic reaction component is operable to react at a pre-selected reservoir temperature to generate a pressure pulse;
mixing the aqueous solution with a viscous fluid component to form a fracturing fluid, the viscous fluid component operable to fracture the hydrocarbon-bearing formation to create fractures, and the fracturing fluid further comprising a proppant component, the proppant component carried to the plurality of fractures by the viscous fluid component, the proppant component operable to hold open the fractures;
injecting the fracturing fluid into the wellbore in the hydrocarbon-bearing formation; and
generating a pressure pulse when the exothermic reaction component reaches the pre-selected reservoir temperature, such that the pressure pulse is operable to create at least a portion of the plurality of fractures.

4. The method of claim 1, wherein the exothermic reaction component comprises an ammonium containing compound and a nitrite containing compound.

5. The method of claim 4, wherein the ammonium containing compound comprises $NH_4Cl$ and the nitrite containing compound comprises $NaNO_2$.

6. The method of claim 3, wherein the pre-selected solution pH is between 5.7 and 9.

7. The method of claim 3, wherein the reservoir temperature is in a range between 48.8° C. (120° F.) and 121.1° C. (250° F.).

8. The method of claim 3, wherein the pressure pulse is between 500 psi and 50,000 psi.

9. The method of claim 3, wherein the pressure pulse creates fractures in less than 10 seconds.

10. The method of claim 3, wherein the pressure pulse creates fractures in less than 5 seconds.

11. A system for increasing a stimulated reservoir volume in a hydrocarbon-bearing formation in fluid communication with a wellbore, the system comprising:
a vertical wellbore;
a plurality of lateral extensions at varying depths in the formation extending from the vertical wellbore and drilled at least in part using underbalanced coiled tubing drilling to avoid damage to the hydrocarbon-bearing formation; and
a plurality of fractures extending outwardly from and between the plurality of lateral extensions to create a multilateral fracture network, where the plurality of fractures do not cause damage to the formation or reduce permeability, the plurality of fractures being created at least in part by injecting a non-combustive exothermic reaction component into the plurality of lateral extensions, the plurality of fractures including fractures extending from at least one toe of one lateral extension toward at least one other lateral extension contributing to the multilateral fracture network between the plurality of lateral extensions.

12. The system of claim 11, the system further comprising a proppant to support the plurality of fractures.

13. The system of claim 11, wherein at least two lateral extensions of the plurality of lateral extensions align generally along a vertical plane.

14. The system of claim 11, wherein the plurality of fractures includes a first plurality of fractures extending from a first lateral extension and wherein the plurality of fractures includes a second plurality of fractures extending from a second lateral extension, and where the first plurality of fractures and second plurality of fractures at least partially intersect and create a portion of the multilateral fracture network between the first lateral extension and the second lateral extension.

* * * * *